United States Patent
Tanaka et al.

(10) Patent No.: US 6,889,184 B2
(45) Date of Patent: May 3, 2005

(54) DEVICE FOR IMPROVING VOICE SIGNAL IN QUALITY

(75) Inventors: Masato Tanaka, Tokyo (JP); Meizhong Wang, Tokyo (JP); Kazuhiko Seki, Tokyo (JP)

(73) Assignee: Uniden Corporation, Tokyo (JP)

(*) Notice: Subject to any disclaimer, the term of this patent is extended or adjusted under 35 U.S.C. 154(b) by 765 days.

(21) Appl. No.: 09/739,225

(22) Filed: Dec. 19, 2000

(65) Prior Publication Data

US 2002/0019960 A1 Feb. 14, 2002

(30) Foreign Application Priority Data

Jun. 23, 2000 (JP) .................................... 2000-189094

(51) Int. Cl.[7] ............................................ G10L 19/00
(52) U.S. Cl. ....................... 704/212; 375/244; 714/746
(58) Field of Search ..................... 704/212; 375/244; 714/746

(56) References Cited

U.S. PATENT DOCUMENTS

| | | | | |
|---|---|---|---|---|
| 5,768,291 A | * | 6/1998 | Kelton et al. | 714/746 |
| 5,799,039 A | * | 8/1998 | Laird et al. | 375/244 |
| 6,078,620 A | * | 6/2000 | Rennig | 375/244 |
| 6,578,162 B1 | * | 6/2003 | Yung | 714/708 |
| 6,731,635 B1 | * | 5/2004 | Brueckheimer et al. | 370/395.1 |

FOREIGN PATENT DOCUMENTS

JP   8-223126   8/1996

OTHER PUBLICATIONS

Shuji Kubota et al., "Improved ADPCM voice signal transmission employing click–noise detection scheme for TDMA–TDD personal communication system", IEEE transations on vehicular technology, vol. 46, No. 1, Feb. 1997.*

* cited by examiner

*Primary Examiner*—Richemond Dorvil
*Assistant Examiner*—Qi Han
(74) *Attorney, Agent, or Firm*—McDermott Will & Emery LLP

(57) ABSTRACT

Provided is a code correction circuit for presuming an error pattern of the received code when a received ADPCM code contains a click noise and correcting such error. A device for improving voice signal comprises a click noise detector (13) which judges that a received ADPCM code contains a click noise when a short interval average value of the absolute value of the received ADPCM code exceeds a predetermined value, and a code correction circuit (11) which presumes an error position of the bit of the received ADPCM code and corrects such error so as to minimize the variation in the short interval average value of the absolute value of the received ADPCM code when a transmission error is generated in the receiving ADPCM code judged to be containing a click noise.

2 Claims, 1 Drawing Sheet

DEVICE FOR IMPROVING VOICE SIGNAL IN QUALITY

BACKGROUND OF THE INVENTION

1. Field of the Invention

The present invention relates to technology of, upon the occurrence of an error in a transmission code, presuming the error pattern and correcting such error in an Adaptive Differential Pulse Code Modulation (ADPCM) coding system utilized for voice communication such as digital mobile communication.

2. Description of the Related Art

In a voice signal coding processing by the ADPCM system provided for in KDD Advisory Committee s Recommendation G. 726, a current input signal is predicted from a past input signal, and the difference between the predicted value and an actual value is quantized and transmitted as an ADPCM code. When a radio line is used in voice communications using an ADPCM coding system, an error transmission of a code may occur due to the influence of a channel interference or fading, etc. Upon the occurrence of an error transmission of an ADPCM signal, a click noise (allophone) occures when an ADPCM code is converted by an ADPCM decoder into a PCM code, therefore, in such case of this voice signal coding processing being utilized for digital mobile communications, etc., a device for compensating on a receiving side such error in a transmission code will be required.

Japanese Patent Laid-Open Hei 8-223126, for example, describes a device for improving voice signal in quality as shown in FIG. 2. In FIG. 2, a device for improving voice signal in quality 21 is constructed comprising a sample presumption replacing circuit. The sample presumption replacing circuit 22 receives from a sending set an ADPCM signal via a radio line as well as receives a frame error detecting signal. The frame error detecting signal, when an error occurs in the corresponding frame, outputs "1," and when an error does not occur, "0." The sample presumption replacing circuit 22, when the frame error detecting signal is "1," presumes the status before the occurrence of the error in such code and produces a code, and then replaces such code with the received code. The replacement of code is performed based on the probability distribution of the error pattern of an ADPCM code.

However, as the presumption of an error in a received ADPCM code in the above prior art is performed based on the probability distribution of an error pattern previously calculated, the replacement of a received ADPCM code becomes fixed and an appropriate error correction is not always performed.

Considering that, upon the occurrence of a click noise, the average value for a short interval of an absolute value of the received ADPCM code substantially varies, it would be possible that, when a click noise is detected in such received ADPCM code, a voice signal is improved in quality by presuming the error pattern of the ADPCM code and correcting such error so as to lessen the variation in the average value for a short interval of the absolute value of the received code.

SUMMARY OF THE INVENTION

Thus, an object of the present intention is to provide a device for improving voice signal in quality, when a click noise is included in a received ADPCM code, presuming an error pattern of the received code and performing an error correction so as to lessen the average value for a short interval of the absolute value of the received code.

To solve the above problem, a device for improving voice signal in quality of the present invention comprises a click noise detector which, when the average value for a short interval of a received ADPCM code exceeds a predetermined value, judges that such received ADPCM code contains a click noise, and a code correction circuit which, when a transmission error occurs in the received ADPCM code judged as containing a click noise, presumes an error position of a bit of the received ADPCM code and performs an error correction so as to minimize the variation in the average value for a short interval or the absolute value of the received ADPCM code.

DESCRIPTION OF THE PREFERRED EMBODIMENTS

An embodiment of the present invention is now described with reference to the respective figures.

Figure 1:
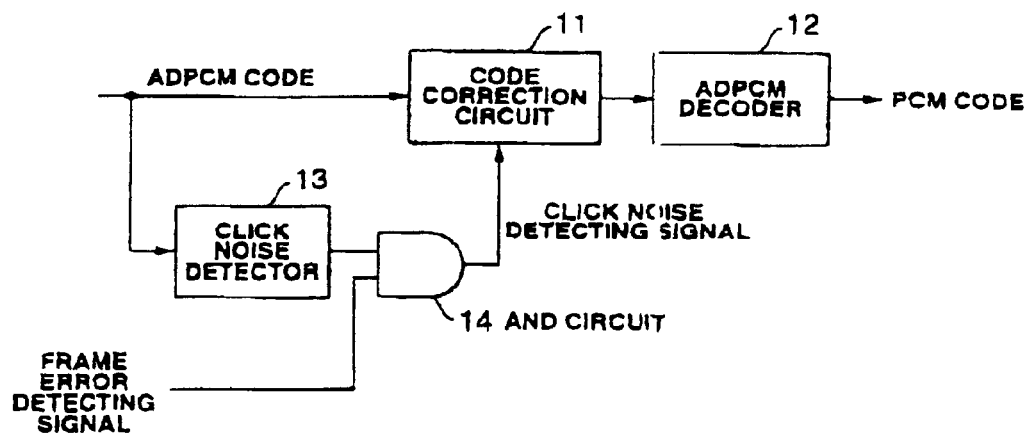
FIG. 1 is a circuit diagram illustrating a device for improving voice signal in quality of this embodiment.
Figure 2:
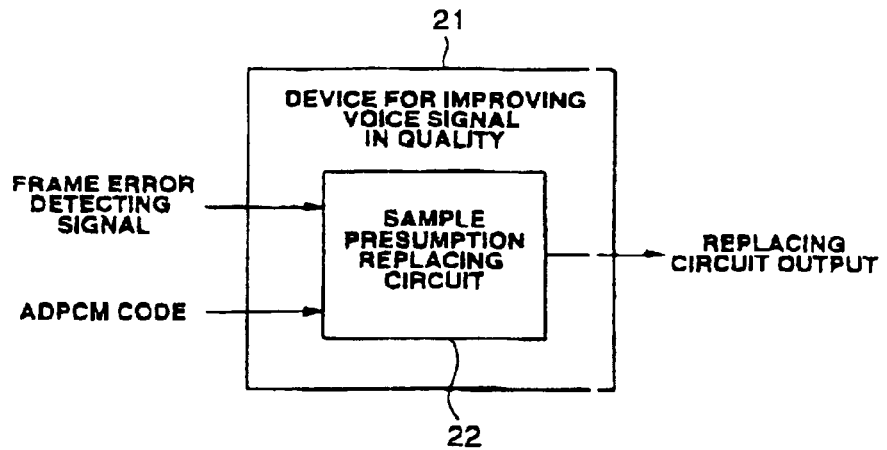
FIG. 2 is a block diagram of a conventional device for improving voice signal in quality.

FIG. 1 is a circuit diagram of a device for improving voice signal in quality of the present invention. The device for improving voice signal in quality is constructed comprising a code correction circuit 11, an ADPCM decoder 12, a click noise detector 13 and an AND circuit 14. In FIG. 1, a received ADPCM code of 32 kbps is supplied to the code correction circuit 11 and the click noise detector 13. The click noise 13 calculates the average value for a short interval of the absolute value of the received ADPCM code and, when such average value for a short interval exceeds a predetermined value, judges that a click noise is occurred. Provided that a received ADPCM code at time k is I (K) and the average value for a short interval thereof is D(k), D(k) can be obtained according to formula (1).

$$D(k) = \alpha D(k-1) + (1-\alpha) F(I(k)) \quad (1)$$

Here, I (k) can be obtained when a differential signal of a PCM signal and a predicted signal is converted into a logarithm the base of which is 2, normalized such logarithm using a scale factor, and coded it in 4 bits according to the translation table of a quantizer. That is, function F (x), as shown in Table 1, has the following values in view of |x|.

TABLE 1

| $|x|$ | 7 | 6 | 5 | 4 | 3 | 2 | 1 | 0 |
|---|---|---|---|---|---|---|---|---|
| $F(x)$ | 7 | 3 | 1 | 1 | 1 | 0 | 0 | 0 |

The click noise detector 13 outputs a signal of "1" to the AND circuit 14 upon judging that a click noise is occurred in a received ADPCM code. Further, the received ADPCM code is inspected using a Cyclic Redundancy Check (CRC) as to whether or not it has an error, and if an error is detected, the output of a frame error detecting signal becomes "1." Accordingly, when a click noise is detected by the click noise detector 13 and a frame error is detected by the CRC, the output of the AND circuit 14 becomes "1" and is supplied to the code correction circuit 11 as a click noise detection signal.

The code correction circuit 11, upon receiving a click noise detecting signal, presumes which bit among I(K) of 4 bits has an error and performs a code correction. The presumption of the code error is performed so as to lessen the variation in the average value for a short interval of the absolute valve. Upon finding the difference between D (K) and D(k-1) in reference to formula (1, formula (2) below will be obtained.

$$D(k)-D(k-1)=(1-\alpha)\{F(I(K))-D(k-1)\} \quad (2)$$

As the (1−α) on the right side is a fixed number, in order to obtain the variation in the average value for a short interval of the absolute value of the received code, only the value of F(I(k))−D(k-1) is required. Here, dmsd(k) representing the difference information of the average value for a short interval of the absolute value of the received code is defined as formula (3).

$$dmsd(k)=|F(I(k)-D(k-1)| \quad (3)$$

Here, presuming that an one bit error being occurred in the received ADPCM code, the difference information dmsd1(k) of the average value for a short interval of the absolute value of the received code in the case of an error in the lowest bit being occurred will be defined as formula (4).

$$dmsd1(k)=|F(I(k)\wedge(0001)_2)-D(k-1)| \quad (4)$$

In this specification, the mark "∧" means an exclusive OR and (I(k) ∧0001) is a reverse of the lowest bit of I(k). Similarly, when an error is occurred in the second lowest bit, the third lowest bit (the second highest bit) and the fourth lowest bit (the highest bit), the difference information dmsd2(k), dmsd3(k) and dmsd4(k)of the average value for a short interval of the absolute value will be obtained according to formulas (5) through (7) respectively.

$$dmsd2(k)=|F(I(K)\wedge(0010)_2)-D(k-1)| \quad (5)$$

$$dmsd3(k)=|F(I(K)\wedge(0100)_2)-D(k-1)| \quad (6)$$

$$dmsd4(k)=|F(I(K)\wedge(1000)_2)-D(k-1)| \quad (7)$$

If an error is detected in the received ADPCM code as a result of the CRC presuming that this error is one bit, it is possible to find in which bit the error occurs by comparing each value from formulas (3) through (7). For example, when the value of formula (5) is the minimum, it indicates that an error occurs in the second lowest bit. When there is no error, the value of formula (3) is the minimum. The code correction circuit 1 presumes an error position of the bit comparing each value of formula (3) through (7) and performs a code correction of the received ADPCM code. The ADPCM code, after the correction, is supplied to the ADPCM decoder 12 and converted into a PCM code of 64 kbps. The PCM code is converted with a PCM decoder (not shown) into a voice signal.

Further, in the above description, a click noise is judged to be occurred when the average value for a short interval of the absolute value of the received ADPCM code exceeds a predetermined value, however, a click noise may be judged to be occurred when a differential value of the average value for a short interval of the absolute value of the received code, that is, the difference value of D(K) exceeds a predetermined value. Further, the above two methods may be jointly adopted.

Furthermore, in the above description, an error correction was performed presuming that the received ADPCM code has an one bit error, but even in the case of two bits or three bits error occurring, the error bit can be presumed as the above.

According to the present invention, an error correction can be performed so as to lessen the variation by presuming an error pattern of the average value for a short interval of the absolute value of a received code, therefore, a voice signal can be improved in quality.

What is claimed is:

1. A device for improving voice signal in quality comprising:

a click noise detector which judges that received ADPCM code contains a click noise when a short interval average value of the absolute value of said received ADPCM code exceeds a predetermined value; and a code correction circuit which presumes an error position of the bit of said received ADPCM code and corrects the error so as to minimize the variation in said short interval average value of the absolute value of said received ADPCM code when a transmission error is generated in said received ADPCM code judged to be containing a click noise.

2. A device for improving voice signal in quality comprising:

a click noise detector which, then a differential value of a short interval average value of the absolute value of a received ADPCM code exceeds a predetermined value, judges that said received ADPCM code contains a click noise; and a code correction circuit which, when a transmission error is generated in said received ADPCM code judged to contain a click noise, presumes an error position of bits of said received ADPCM code and performs correction of the error so as to minimize the variation in said average value for a short interval of the absolute value of said received ADPCM code.

* * * * *